3,351,660
NF₂ ADDUCTS OF CYCLOOCTATETRAENE
AND PREPARATION THEREOF
Lawrence J. Engel, Dunellen, Somerset, N.J., assignor to Esso Research and Engineering Company, a corporation of Delaware
No Drawing. Filed Apr. 9, 1963, Ser. No. 272,505
7 Claims. (Cl. 260—563)

This invention relates to a high-energy oxidizer synthesized by reacting cyclooctatetraene with $N_2F_4$. The synthesis product thus formed and isolated is an adduct having a high $NF_2$ content, such as found in the hexakis ($NF_2$) and octakis($NF_2$) cyclooctatetraene derivative.

Although a number of $NF_2$-containing organic oxidizers suitable as high-energy components of propellants are known, e.g. tetrakis($NF_2$) butane and tetrakis($NF_2$) tetrahydrofuran, such compounds have given some practical difficulties in being too volatile and in having a relatively low viscosity. Therefore, attempts have been made to prepare $NF_2$-containing oxidizers characterized by being higher boiling viscous liquids and/or solids and which also have a high proportion of $NF_2$ to carbon, high stability, and suitable compatibility with other compounds of a propellant composite.

In accordance with the present invention with the object of preparing low volatility and viscous $NF_2$-containing oxidizers, the reaction of 1,3,5,7-cyclooctatetraene, given the abbreviation COT, with $N_2F_4$ was investigated. It was found surprisingly that this reaction can be carried out to produce desired products. The compound cyclooctatetraene has the structural formula:

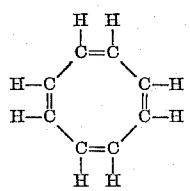

Cyclooctatetraene (COT)

From the studies that have been carried out on the reaction of the cyclooctatetraene with $N_2F_4$, it has been observed that the reaction tends to take place in stages toward complete saturation of the double bonds when the reaction is carried out under $N_2F_4$ gas pressures of from about 200 mm. Hg abs. to about 450 p.s.i.g., using from 2 to 10 moles of $N_2F_4$ per mole of the cyclooctatetraene, and with or without the use of diluents such as $N_2$, perhalohydrocarbons such as $CF_4$, $CCl_4$ and others which act as inert diluents, and with contact times ranging from about 1 to 5 hours or more, depending on the reaction temperature in the stage. The reaction temperatures in the initial stages are in the range of about 20° to 100° C., and in subsequent stages are in the range of about 100° to 175° C. At temperatures greater than 175° C., shorter contact times may be used by carrying out the reaction in a flow type system.

The following example illustrates procedure for carrying out the addition reaction of $N_2F_4$ with cyclooctatetraene.

Example

A series of reactions were carried out at 450 p.s.i.g., 5 to 10/1 mole ratio of $CCl_4$/COT and 5 to .8/1 mole ratio of $N_2F_4$/COT in ⅜ inch stainless steel reactors.

With the $N_2F_4$ and COT reactants admixed in the $CCl_4$ diluent to form the reaction mixture, after 1 hour at 23° C. the reaction mixture was maintained at 50° C. for 5 hours, and the resulting liquid reaction product recovered after degassing and removal of diluent was analyzed and found to be a mixture of bis($NF_2$) and tetrakis($NF_2$) adducts of the cyclooctatetraene. This mixture of adducts was found to contain 37.4% C, 14.5% N, and 40.5% F.

In extending the reaction sequence to 1 hour at 23° C., 5 hours at 150° C., and 5 hours at 175° C., a water-white liquid product was obtained which, on chemical analysis, correspond to the tetrakis adduct having 30.6% C, 17.9% N, and 48.5% F. The fineline NMR interpretation showed the proton distribution is a tetrakis adduct, the presence of no C=NF or C—F, remaining nonconjugated double bond system, and no internal rearrangement.

Next, a temperature program for the reaction in stages was 1 hour at 23° C., 5 hours at 50° C., 5 hours at 100° C., followed by degassing and charging fresh $N_2F_4$ for further reaction for 5 hours at 100° C. and 3 hours at 150° C. Elemental analysis of the adduct product after solvent removal, but with no other separation, showed that the product contained a mixture of adducts with a composition between that of hexakis($NF_2$) adduct, $C_8H_8(NF_2)_6$, and octakis($NF_2$) adduct, $C_8H_8(NF_2)_8$. The proportion of the octakis adduct amounted to about 15 to 25%.

The NMR interpretation indicated no C=NF or C—F, no internal rearrangement, and an olefinic hydrogen constituent with about 75 to 85% of the hexakis adduct, 15 to 25% of nonolefinic species.

Studies were made on the system with the aim of shortening the reaction time cycle and increasing the conversion of the starting material of the octakis adduct.

In efforts to shorten the time cycle in the series of reaction stages, a reaction mixture was held for 1 hour at 50° C., 2 hours at 75° C., 3 hours at 100° C., and 3 hours at 150° C. These tests indicated the likelihood of detonations at the more elevated temperatures of 100° C. and 150° C., evidently due to insufficient reaction to form the tetrakis at temperatures below 100° C. Also, in attempting to increase the reaction temperature higher than 150° C., it was found that it was safer to have the reaction mixture of the tetrakis adduct and the $N_2F_4$ kept for at least 3 hours contact time at temperatures in the range of 100° to 150° C. Similarly, the reaction temperature could not be maintained at 150° C. for a much longer period than 3 hours to form more octakis adduct without causing degradation, and this can be attributed to insufficient early reaction to form the hexakis adduct. Operations at 200° C. tended to form degraded or carbonized product.

To make a separation of the higher adducts, e.g. the unsaturated hexakis from the octakis, certain separation techniques may be used, such as silical gel chromatography.

The resulting higher adduct products separated are represented by the structural formulae:

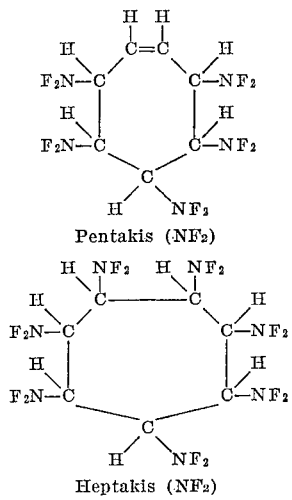

Pentakis (NF$_2$)

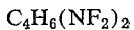

Heptakis (NF$_2$)

In its use as a solid rocket propellant component, the higher NF$_2$ adducts of cyclooctatetraene correspond in energy value to tetrakis(NF$_2$) butane and hexakis(NF$_2$) hexane, but give the added advantage of a lower volatility and a higher viscosity when compounded with other components, such as a polymeric binder, finely-divided oxygen oxidizer, and metal-containing fuel. The higher NF$_2$ adduct of cyclooctatetraene may be used with such binders as represented by NF$_2$-containing polybutadiene, $$C_4H_6(NF_2)_2$$

various oxygen oxidizers such as ammonium perchlorate, hydrazine perchlorate, hexanitroethane, and with powdered fuels such as B, Al, Be, Li and hydrides of such metals. The higher NF$_2$ adducts of cyclooctatetraene can be used in propellant composites which achieve Isp values above 270.

Cyclooctatetraene has become known as a polymer of acetylene and has been indicated as being unstable in many reactions in which benzene can be used. From the studies and discoveries of the present invention, it is indicated that the cyclooctatetraene can be reacted to form the high-energy derivatives containing CNF$_2$ groups by using the proper precautions, such as first forming the tetrakis adduct at temperatures between 20° and 100° C. in a period of about 5 to 10 hours and then reacting the tetrakis adduct with more N$_2$F$_4$ reactant to form the hexakis and octakis adducts at temperatures in the range of 100° to 175° C. in a period of about 5 to 10 hours.

What is claimed is:
1. An NF$_2$ adduct of cyclooctatetraene.
2. Bis(NF$_2$) adduct of cyclooctatetraene.
3. Tetrakis(NF$_2$) adduct of cyclooctatetraene.
4. Hexakis(NF$_2$) adduct of cyclooctatetraene.
5. Octakis(NF$_2$) adduct of cyclooctatetraene.
6. Process for preparing tetrakis adduct of cyclooctatetraene, which comprises reacting a mole of cyclooctatetraene with 2 moles of N$_2$F$_4$ in a period of about 5 to 10 hours at temperatures in the range of 20° to 100° C.
7. Process for preparing hexakis and octakis adducts of cyclooctatetraene, which comprises reacting tetrakis(NF$_2$) adduct of cyclooctatetraene with from 1 to 2 moles of N$_2$F$_4$ per mole of the tetrakis adduct in a period of about 5 to 10 hours at temperatures in the range of 100° to 175° C.

References Cited

UNITED STATES PATENTS 3,215,709  11/1965  Logothetis _____ 260—349

CHARLES B. PARKER, *Primary Examiner.*

CARL QUARFORTH, *Examiner.*

L. A. SEBASTIAN, P. C. IVES, *Assistant Examiners.*